United States Patent
Hensman et al.

(10) Patent No.: US 7,115,670 B2
(45) Date of Patent: *Oct. 3, 2006

(54) FISCHER-TROPSCH SYNTHESIS PROCESS

(75) Inventors: John Richard Hensman, Hertfordshire (GB); David Newton, Surrey (GB)

(73) Assignees: BP Exploration Operating Company Limited, London (GB); Davy Process Technology Limited, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 10/476,799

(22) PCT Filed: May 17, 2002

(86) PCT No.: PCT/GB02/02307

§ 371 (c)(1),
(2), (4) Date: Apr. 27, 2004

(87) PCT Pub. No.: WO02/096835

PCT Pub. Date: Dec. 5, 2002

(65) Prior Publication Data

US 2004/0180976 A1    Sep. 16, 2004

(30) Foreign Application Priority Data

May 25, 2001  (GB)  .................................. 0112788.5
May 25, 2001  (GB)  .................................. 0112790.1

(51) Int. Cl.
C07C 27/00  (2006.01)

(52) U.S. Cl. ...................... 518/712; 518/700; 518/705; 518/706; 518/711

(58) Field of Classification Search ................ 518/711, 518/712, 705, 700, 706
See application file for complete search history.

(56) References Cited

U.S. PATENT DOCUMENTS 5,961,933 A    10/1999   Casanave et al.

FOREIGN PATENT DOCUMENTS

WO    WO 01/38269 A1    5/2001

*Primary Examiner*—J. Parsa
(74) *Attorney, Agent, or Firm*—Nixon & Vanderhye

(57) ABSTRACT

A process for the conversion of synthesis gas to higher hydrocarbons by synthesis gas, at an elevated temperature and pressure, with a suspension of a particulate Fischer-Tropsch catalyst, in a system comprising at least one high shear mixing zone and a reactor vessel wherein the process comprises: (a) passing the suspension and the gaseous stream through the high shear mixing zone wherein the gaseous stream is broken down into gas bubbles and/or irregularly shaped gas voids; (b) discharging suspension having gas bubbles and/or irregularly shaped gas voids dispersed therein from the high shear mixing zone into the reactor vessel; and (c) maintaining the temperature of the suspension discharged into the reactor vessel at the desired reaction temperature by means of an internal heat exchanger positioned within the suspension in the reactor vessel. At least 5% of the exothermic heat of reaction is removed from the system by means of the internal heat exchanger. The remainder of the exothermic heat of reaction may be removed from the system by means of an external heat exchanger and/or through the introduction of a liquid coolant.

43 Claims, 2 Drawing Sheets

FISCHER-TROPSCH SYNTHESIS PROCESS

This application is the U.S. National Phase of International Application PCT/GB02/02307, filed May 17, 2002, which designated the U.S.

BACKGROUND OF THE INVENTION

The present invention relates to a process for the conversion of carbon monoxide and hydrogen (synthesis gas) to liquid hydrocarbon products in the presence of a Fischer-Tropsch catalyst.

In the Fischer-Tropsch synthesis reaction a gaseous mixture of carbon monoxide and hydrogen is reacted in the presence of a catalyst to give a hydrocarbon mixture having a relatively broad molecular weight distribution. This product is predominantly straight chain, saturated hydrocarbons which typically have a chain length of more than 2 carbon atoms, for example, more than 5 carbon atoms. The reaction is highly exothermic and therefore heat removal is one of the primary constraints of all Fischer-Tropsch processes. This has directed commercial processes away from fixed bed operation to slurry systems. Such slurry systems employ a suspension of catalyst particles in a liquid medium thereby allowing both the gross temperature control and the local temperature control (in the vicinity of individual catalyst particles) to be significantly improved compared with fixed bed operation.

Fischer-Tropsch processes are known which employ slurry bubble columns in which the catalyst is primarily distributed and suspended in the slurry by the energy imparted from the synthesis gas rising from the gas distribution means at the bottom of the slurry bubble column as described in, for example, U.S. Pat. No. 5,252,613.

The Fischer-Tropsch process may also be operated by passing a stream of the liquid medium through a catalyst bed to support and disperse the catalyst, as described in U.S. Pat. No. 5,776,988. In this approach the catalyst is more uniformly dispersed throughout the liquid medium allowing improvements in the operability and productivity of the process to be obtained.

GB 728543 relates to a process for the production of hydrocarbons by the reaction of synthesis gas in the presence of a catalyst which may be suspended in finely divided form within the hydrocarbon oil (contact oil). A mechanically moved stream of contact oil circulating after the separation of the gas, and the synthesis gas is introduced into the reaction chamber below a cooling arrangement disposed therein, suitably by means of one or a series of nozzles. Cooling of the contact oil or mixture of contact oil and gas in the reaction chamber is effected in a number of stages in such manner that the mixture of synthesis gas and contact oil successively flows through cooling stages at increasing temperature. Owing to the fact that the individual cooling stages have a temperature increasing from the bottom upwards, the reaction can be retarded in places where the concentration of carbon monoxide and hydrogen is highest, namely in the lower part of the reaction tower, by the application of low temperatures. In accordance with the reduction of the concentration of the reaction substances, the temperature is then increased in the higher zones of the reaction tower, so that the complete reaction between the carbon monoxide and the hydrogen, corresponding substantially to equilibrium, is obtained in the neighborhood of the top of the reaction tower. Thus, GB 728,543 relates to a plug flow reactor vessel where the reaction conditions vary in the individual cooling stages.

SUMMARY OF THE INVENTION

We have recently found that a Fischer-Tropsch process may be operated by contacting synthesis gas with a suspension of catalyst in a liquid medium in a system comprising at least one high shear mixing zone and a reactor vessel. The suspension is passed through the high shear mixing zone(s) where synthesis gas is mixed with the suspension under conditions of high shear. The shearing forces exerted on the suspension in the high shear mixing zone(s) are sufficiently high that the synthesis gas is broken down into gas bubbles and/or irregularly shaped gas voids. Suspension having gas bubbles and/or irregularly shaped gas voids dispersed therein is discharged from the high shear mixing zone(s) into the reactor vessel where mixing is aided through the action of the gas bubbles and/or the irregularly shaped gas voids on the suspension. The suspension present in the reactor vessel is under such highly turbulent motion that any irregularly shaped gas voids are constantly coalescing and fragmenting on a rapid time scale, for example over a time frame of up to 500 milliseconds, typically between 10 and 500 milliseconds. The transient nature of these irregularly shaped gas voids results in improved heat transfer and mass transfer of gas into the liquid phase of the suspension when compared with a conventional slurry bubble column reactor. The reactor system may therefore be regarded as a continuous stirred tank reactor (CSTR) with the conditions of temperature and pressure and the concentration of reactants and products being substantially constant throughout the body of suspension in the reactor vessel. The reactor vessel may be a tank reactor in which case a suspension recycle stream is withdrawn from the reactor vessel and may be recycled to the high shear mixing zone(s) via an external conduit. Exothermic heat of reaction may be removed from the system by means of a heat exchanger positioned in the external conduit (external heat exchanger). Optionally, further exothermic heat of reaction may be removed from the system by means of a heat exchanger, for example, cooling tubes or coils positioned within the suspension in the reactor vessel (internal heat exchanger). This process is described in WO 0138269 (PCT patent application number GB 0004444) which is herein incorporated by reference. However, a problem may arise when operating the process of WO 0138269 in that there maybe a limit on the temperature to which the suspension may be cooled by the external heat exchanger owing to the risk of quenching the reaction and/or deactivating the catalyst. In the absence of an internal heat exchanger, this may necessitate circulating suspension around the external loop conduit at an uneconomic flow rate.

It has now been found that where a slurry process is operated in a reactor system comprising at least one high shear mixing zone and a reactor vessel that it is advantageous to remove at least a 5% of the exothermic heat of reaction from the system by means of an internal heat exchanger.

Accordingly, the present invention relates to a process for the conversion of synthesis gas to higher hydrocarbons by contacting a gaseous stream comprising synthesis gas, at an elevated temperature and pressure, with a suspension comprising a particulate Fischer-Tropsch catalyst suspended in a liquid medium, in a system comprising at least one high shear mixing zone and a reactor vessel wherein the process comprises:

(a) passing the suspension and the gaseous stream through the high shear mixing zone(s) wherein the gaseous stream is broken down into gas bubbles and/or irregularly shaped gas voids;

(b) discharging suspension having gas bubbles and/or irregularly shaped gas voids dispersed therein from the high shear mixing zone(s) into the reactor vessel;

(c) maintaining the temperature of the suspension discharged into the reactor vessel at the desired reaction temperature by means of an internal heat exchanger positioned within the suspension in the reactor vessel characterized in that at least 5% of the exothermic heat of reaction is removed from the system by means of the internal heat exchanger.

For avoidance of doubt, conversion of synthesis gas to higher hydrocarbons may be initiated in the high shear mixing zone(s). However, it is envisaged that the majority of the conversion of the synthesis gas to higher hydrocarbons will take place in the reactor vessel.

Typically, at least 10%, preferably at least 20%, more preferably at least 40%, most preferably at least 50% of the exothermic heat of reaction is removed from the system by means of the internal heat exchanger. It is envisaged that substantially all of the exothermic heat of reaction may be removed from the system by means of the internal heat exchanger. However, it is preferred that between 20 to 50%, more preferably 30 to 50% of the exothermic heat of reaction is removed from the system by means of the internal heat exchanger.

Preferably, suspension is withdrawn from the reactor vessel and is at least in part recycled to the high shear mixing zone(s) (hereinafter referred to as "suspension recycle stream"). Suitably, the suspension recycle stream is cooled outside of the reactor vessel and high shear mixing zone(s) by means of a further heat exchanger (hereinafter "external heat exchanger") in order to further assist in the removal of exothermic heat of reaction from the system. Preferably, between 20 to 55%, more preferably, 30 to 50%, for example 40 to 50% of the exothermic heat of reaction is removed from the system in the external heat exchanger. Preferably, the suspension recycle stream is cooled to a temperature not more than 30° C. below, preferably, not more 12° C. below, the temperature of the suspension in the reactor vessel.

Preferably, suspension is withdrawn from the reactor vessel and is recycled to the high shear mixing zone(s) by means of an external conduit having a first end in communication with an outlet (for the suspension) in the reactor vessel and a second end in communication with the high shear mixing zone(s). Suitably, the external heat exchanger may be positioned on the external conduit. Preferably, the ratio of the volume of the external conduit (excluding the volume of the external heat exchanger) to the volume of the reactor vessel is in the range of 0.005:1 to 0.2:1. Suitably, a mechanical pumping means, for example, a slurry pump is positioned in the external conduit, preferably upstream of the external heat exchanger.

For a 30,000 barrel/day commercial scale plant, the suspension is suitably recycled through the external conduit at a rate of between 10,000 to 50,000 m$^3$/h, preferably, 15,000 to 30,000 m$^3$/h, more preferably 17,000 to 25,000 m$^3$/h. For a 60,000 barrel/day commercial plant, the suspension is recycled through the external conduit at a rate of between 20,000 to 100,000 m$^3$/h. Thus, the rate at which the suspension is recycled through the external conduit will be pro rata to the size of the commercial scale plant. Suitably, the flow rate through the external conduit may be in the range (n×10,000) m$^3$/h to (n×50,000) m$^3$/h for a (n×30,000) barrel/day commercial plant where n is a number in the range 0.25 to 10, preferably 1.5 to 5.

Preferably, up to 50% by volume, more preferably up to 20% by volume of the hydrogen component of the synthesis gas (hereinafter "hydrogen component") is introduced into the suspension recycle stream.

Without wishing to be bound by any theory, it is believed that the unconverted synthesis gas which is present in the suspension recycle stream may be depleted in hydrogen. An advantage of injecting the hydrogen component into the suspension recycle stream is that this will maintain the ratio of hydrogen to carbon monoxide in the synthesis gas at an optimum value thereby improving the conversion of synthesis gas to higher hydrocarbons. A further advantage of injecting the hydrogen component into the suspension recycle stream is that this may also stabilize the catalyst.

It is also envisaged that up to 50% by volume, preferably up to 20% by volume of the carbon monoxide component of the synthesis gas (hereinafter "carbon monoxide component") may be introduced into the suspension recycle stream.

Suitably, the hydrogen component and/or the carbon monoxide component is introduced into the external conduit either upstream or downstream of the mechanical pumping means, preferably downstream of the mechanical pumping means. Preferably, the hydrogen component and/or carbon monoxide component is introduced to the external conduit upstream of the external heat exchanger. The hydrogen component and/or the carbon monoxide component may be introduced into the external conduit at more than one position along the length of the external conduit.

Preferably, the hydrogen component and/or the carbon monoxide component is introduced into the external conduit via a gas nozzle. Preferably, the pressure drop over the gas nozzle is at least 0.1 bar, more preferably, at least 0.5 bar, for example, at least 1 bar.

Where necessary, the ratio of hydrogen to carbon monoxide in the unconverted synthesis gas within the reactor vessel may be adjusted by feeding additional hydrogen and/or carbon monoxide directly into the reactor vessel, for example, via a gas sparger.

Where the hydrogen component is introduced into the suspension recycle stream in the substantial absence of carbon monoxide, the hydrogen may be obtained from synthesis gas, for example, the hydrogen may be separated from synthesis gas by pressure swing adsorption or by diffusion through a membrane system.

Suitably, the reactor vessel has a diameter of from 5 to 15 meters, preferably 7.5 to 10 meters, more preferably 7.5 to 8 meters. Suitably, the reactor vessel has a length of from 5 to 30 meters, preferably 10 to 20 meters, for example, 15 to 20 meters. For practical reasons, the reactor vessel may be operated with a headspace. Where the reactor vessel has a headspace, the height of the suspension in the reactor vessel is preferably at least 7.5 meters, preferably at least 10 meters.

Preferably, the reactor vessel approximates to a continuous stirred tank reactor (CSTR) having a Peclet number of less than 3, more preferably less than 1, even more preferably approaching zero. The Peclet (Pe) number is defined by the equation:

$$Pe = U_g H / \delta$$

where $U_g$ is the gas velocity (ms$^{-1}$), H is the height of the suspension in the reactor vessel (m), $\delta$ is the dispersion coefficient (m$^2$s$^{-1}$) (see Carberry, J. J., 'Chemical and Catalytic Reaction Engineering', McGraw-Hill, 1976, or Levenspiel, O., 'Chemical Reaction Engineering', Wiley, 1972.).

Owing to the well mixed nature of the suspension in the reactor vessel, it is possible to operate the internal heat exchanger with a large temperature difference between the coolant liquid which is fed to the heat exchanger (hereinafter referred to as "heat exchange liquid") and the temperature of the suspension in the reactor vessel, without any risk of quenching the Fischer-Tropsch synthesis reaction. Thus, the heat exchange liquid fed to the internal heat exchanger is preferably at a temperature which is at least 12° C. below, more preferably, at least 25° C. below, most preferably at least 50° C. below, for example, at least 100° C. below the temperature of the suspension in the reactor vessel. Typically, the heat exchange liquid is fed to the internal heat exchanger at a temperature of less than 100° C., preferably less than 50° C. A suitable heat exchange liquid is water, a solution of an inorganic salt, molten inorganic salts, a high boiling point oil, a glycol or liquid sodium, preferably water.

Preferably, the internal heat exchanger comprises an array of cooling tubes and/or cooling coils and/or cooling plates. Suitably, the array may be divided into independently operated banks of cooling tubes and/or cooling coils and/or cooling plates (hereinafter "banks"). Preferably, the array comprises 5 to 500, more preferably 50 to 500, most preferably 100 to 500 such banks. Suitably, a bank comprises 5 to 50 cooling tubes, or 5 to 20 cooling coils or 5 to 20 cooling plates. The amount of heat which may be removed from the system using the array may be adjusted by (a) independently adjusting the temperature of the heat exchange liquid which is fed to the banks and/or (b) increasing or decreasing the number of banks to which the heat exchange fluid is fed. However, it is preferred to supply heat exchange fluid to all of the banks of the array. Suitably, the temperature of the heat exchange fluid which is fed to at least some of the banks is at least 12° C. below, preferably at least 25° C. below, more preferably at least 50° C. below, for example, at least 100° C. below the temperature of the suspension in the reactor vessel.

Where the heat exchanger comprises an array of cooling tubes, it is preferred that the cooling tubes are arranged substantially parallel to one another with the longitudinal axes of the cooling tubes aligned with the longitudinal axis of the reactor vessel. Preferably, the cooling tubes have an outer diameter in the range 0.625 to 15 cm, more preferably 1.25 to 7.5 cm, most preferably 2 to 5 cm, for example 2.5 cm. Preferably, the cooling tubes may be finned so as to provide a greater heat transfer surface area within the reactor vessel. Suitably, the cooling tubes lie below the level of suspension in the reactor vessel and preferably extend through substantially the whole of the height of the suspension in the reactor vessel, preferably through up to 80% of the height of the suspension in the reactor, more preferably through up to 60% of the height of the suspension in the reactor vessel. Preferably, the cooling tubes are spaced from each other or from the walls of the reactor by 5 to 60 cm, preferably, 7.5 to 25 cm, more preferably 10 to 20 cm, for example, 12.5 cm. Suitably, cooling tubes are absent from the "blast" or "injection" zone(s) of the high shear mixing zone(s) i.e. the region of the reactor vessel into which the high shear mixing zone(s) discharges its contents. Where the high shear mixing zone(s) has a circular outlet, the "blast" or "injection" zone lies within a cylindrical region of the reactor vessel. The centre of the circular section of this cylindrical region is aligned with the centre of the outlet of the high shear mixing zone. Suitably, the diameter of the circular section of the cylindrical region is at least 2 times, preferably at least 3 times the diameter of the outlet of the high shear mixing zone.

Where the heat exchanger comprises an array of cooling coils, each cooling coil may be in the form of a helix with the coil wound as if along a cylinder (hereinafter "cylinder defined by the helix"). It is preferred that the "blast" or "injection" zone of a high shear mixing zone lies within the cylinder defined by the helix. Suitably, the diameter of the cylinder defined by the helix is at least 2 times the diameter of the outlet of a high shear mixing zone, preferably at least 3 times. Preferably, the tubing of the cooling coils has an outer diameter of between 2.5 cm and 10 cm. Preferably, the cooling coils are finned so as to provide a greater heat transfer surface area. Suitably, the cooling coils are spaced apart from each other or from the walls of the reactor vessel by 5 to 60 cm, preferably, 7.5 to 25 cm, more preferably 10 to 20 cm, for example, 12.5 cm. Suitably, the cooling coils lie below the level of suspension in the reactor vessel as described above for the cooling tubes.

Where the heat exchanger comprises an array of cooling plates, it is preferred that cooling plates are concertinaed or corrugated so as to increase the heat transfer area. Preferably, the cooling plates have a breadth of 2 to 10 cm. Preferably, the cooling plates have a depth (distance across the folds of the concertinaed plates or between the peaks and troughs of the corrugated plates) of 10 to 50 cm. Preferably, the cooling plates are spaced apart from each other and from the walls of the reactor vessel by at least 10 cm. Preferably, the longitudinal axes of the cooling plates are aligned with the longitudinal axis of the reactor vessel. Suitably, where the cooling plates are arranged with their longitudinal axes aligned with the vertical axis of the reactor vessel, the cooling plates have a length of 60 to 80% of the height of the suspension in the reactor vessel.

Further cooling may also be provided to the system by introducing a liquid coolant to the reactor vessel and/or the high shear mixing zone(s) and/or to the external conduit. Preferably, the introduction of the liquid coolant removes at least 5%, preferably at least 10% of the exothermic heat of reaction from the system. The liquid coolant may be any liquid which is compatible with a Fischer-Tropsch synthesis reaction. Preferably, the liquid coolant which is to be introduced into the system is at a temperature which is substantially below the temperature of the suspension in the reactor vessel. Preferably, the liquid coolant is at a temperature which is at least 25° C. below, preferably at least 50° C. below, more preferably at least 100° C. below the temperature of the suspension in the reactor vessel. Suitably, the liquid coolant is cooled (e.g. using refrigeration techniques) before being introduced into the system. Preferably, the liquid coolant is cooled to a temperature below 15° C., more preferably, below 10° C.

Preferably, the liquid coolant is a solvent which is capable of vaporizing under the process conditions (i.e. at an elevated temperature and pressure). Such a liquid coolant is hereinafter referred to as "vaporizable liquid coolant"). Without wishing to be bound by any theory it is believed that the latent heat of vaporization of the vaporizable liquid coolant removes at least some of the exothermic heat of reaction from the system.

Suitably, the vaporizable liquid coolant has a boiling point, at standard pressure, in the range of from 30 to 280° C., preferably from 30 to 100° C. Preferably, the vaporizable liquid coolant is selected from the group consisting of aliphatic hydrocarbons having from 5 to 10 carbon atoms, alcohols (preferably, alcohols having from 1 to 4 carbon atoms, in particular, methanol and ethanol or a glycol), ethers (for example, dimethyl ether) tetrahydrofuran, and water. In order to simplify the process, it is preferred that the vaporizable liquid coolant is selected from the group consisting of water (a by-product of the Fischer-Tropsch synthesis reaction) and low boiling liquid higher hydrocarbons, such as higher hydrocarbon having from 5 to 10 carbon atoms, in particular, pentanes, hexanes, or hexenes.

The high shear mixing zone(s) may be part of the system inside or outside the reactor vessel, for example, the high shear mixing zone(s) may project through the walls of the reactor vessel such that the high shear mixing zone(s) discharges its contents into the reactor vessel. Preferably, the reactor system comprises a plurality of high shear mixing zones. Preferably the reactor system comprises 2 to 500 high shear mixing zones, more preferably 10 to 400 high shear mixing zones, most preferably, 20 to 300, for example, 25 to 150 high shear mixing zones. The high shear mixing zones may discharge into a single reactor vessel which has an advantage of significantly reducing the size of a commercial plant. However, it is also envisaged that the high shear mixing zones may discharge into 2 or 3 reactor vessels which are connected in series. Where the reactor system comprises 2 or 3 reactor vessels, the high shear mixing zones may be divided substantially equally between the reactor vessels in the series. However, it is also envisaged that high shear mixing zones may be unequally distributed between the reactor vessels in the series. Where the reactor system comprises a plurality of high shear mixing zones, the cooling tubes and/or cooling coils and/or cooling plates of the internal heat exchanger are substantially absent from the "blast" or "injection" zones of each of the high shear mixing zones.

The high shear mixing zone(s) may comprise any device suitable for intensive mixing or dispersing of a gaseous stream in a suspension of solids in a liquid medium, for example, a rotor-stator device, an injector-mixing nozzle or a high shear pumping means such as a propeller or paddle having high shear blades.

Preferably, the high shear mixing zone(s) is an injector mixing nozzle(s). Preferably the injector mixing nozzle(s) is at or near the top of the reactor vessel and projects downwardly into the reactor vessel i.e. is a downshot nozzle. However, it is envisaged that the injector mixing nozzle(s) may be at or near the bottom of the reactor vessel and projects upwardly into the reactor vessel i.e. is an upshot nozzle. The nozzle may also be angled, preferably at an angle of no more than 25°, preferably no more than 10°, more preferably, no more than 5° relative to the longitudinal axis of the reactor vessel. Suitably, a plurality of injector mixing nozzles are spaced apart in the reactor vessel, preferably at or near the top or bottom of the reactor vessel so that there is substantially no overlap between the blast zones of the nozzles. It is also envisaged that the reactor vessel may be provided with additional nozzles (injector mixing nozzles, liquid only nozzles or gas only nozzles) which may be used to create turbulence in any quiescent regions of the reactor vessel thereby avoiding sedimentation of the particulate catalyst.

The outlet of the nozzle(s) may be tapered outwardly so that the spray which exits the nozzle (suspension having gas bubbles and/or irregularly shaped gas voids dispersed therein) diverges outwardly, preferably, at an angle of less than 60°, more preferably at an angle of less than 40°, most preferably at an angle of less than 30° relative to the initial direction of discharge of the spray, for example, diverges outwardly relative to the longitudinal axis of the reactor vessel.

The injector-mixing nozzle(s) can advantageously be executed as a venturi tube (c.f. "Chemical Engineers' Handbook" by J. H. Perry, $3^{rd}$ edition (1953), p.1285, FIG. 61), preferably an injector-mixer (c.f. "Chemical Engineers' Handbook" by J H Perry, $3^{rd}$ edition (1953), p 1203, FIG. 2 and "Chemical Engineers' Handbook" by R H Perry and C H Chilton $5^{th}$ edition (1973) p 6–15, FIGS. 6–31) or most preferably as liquid-jet ejector (c.f. "Unit Operations" by G G Brown et al , $4^{th}$ edition (1953), p.194, FIG. 210). Where the injector-mixing nozzle(s) is a venturi tube, the constriction within the tube generally has a diameter of from 2.5 to 50 cm, preferably 5 to 25 cm. Alternatively, the injector-mixing nozzle(s) may be executed as a "gas blast" or "gas assist" nozzle where gas expansion is used to drive the nozzle (c.f. "Atomisation and Sprays" by Arthur H Lefebvre, Hemisphere Publishing Corporation, 1989). Where the injector-mixing nozzle(s) is executed as a "gas blast" or "gas assist" nozzle, the suspension of catalyst is fed to the nozzle at a sufficiently high pressure to allow the suspension to pass through the nozzle while the gaseous stream comprising synthesis gas is fed to the nozzle at a sufficiently high pressure to achieve high shear mixing within the nozzle.

The high shear mixing zone(s) may also comprise an open-ended conduit having a venturi plate located therein. Preferably, the venturi plate is located close to the open end of the conduit, for example, within 0.5 meters of the open end of the conduit. Suspension is fed down the conduit to the venturi plate at a sufficiently high pressure to pass through apertures in the plate while a gaseous stream comprising synthesis gas is drawn into the conduit through at least one opening, preferably 2 to 50 openings, in the wall of the conduit. Preferably, the opening(s) is located immediately downstream of the venturi plate. Suitably, the venturi plate has between 2 to 50 apertures. Preferably, the apertures are circular having diameters in the range of 1 mm to 100 mm. Suspension having gas bubbles and/or irregularly shaped gas voids dispersed therein is then discharged into the reactor vessel though the open end of the conduit. Suitably, the open end of the conduit is tapered outwardly, preferably at an angle of 5 to 30°, preferably 10 to 25° relative to the longitudinal axis of the conduit. Conveniently, the external conduit may recycle the suspension recycle stream to the open-ended conduit.

Where the high shear mixing zone(s) is executed as a venturi nozzle(s) (either as a venturi tube or as a venturi plate), the pressure drop of the suspension over the venturi nozzle(s) is typically in the range of from 1 to 40 bar, preferably 2 to 15 bar, more preferably 3 to 7 bar, most preferably 3 to 4 bar. Preferably, the ratio of the volume of gas ($Q_g$) to the volume of liquid ($Q_l$) passing through the venturi nozzle(s) is in the range 0.5:1 to 10:1, more preferably 1:1 to 5:1, most preferably 1:1 to 2.5:1, for example, 1:1 to 1.5:1 (where the ratio of the volume of gas ($Q_g$) to the volume of liquid ($Q_l$) is determined at the desired reaction temperature and pressure).

Where the high shear mixing zone(s) is executed as a gas blast or gas assist nozzle(s), the pressure drop of gas over the nozzle(s) is preferably in the range 3 to 100 bar and the pressure drop of suspension over the nozzle(s) is preferably in the range of from 1 to 40 bar, preferably 4 to 15, most preferably 4 to 7. Preferably, the ratio of the volume of gas ($Q_g$) to the volume of liquid ($Q_l$) passing through the gas blast or gas assist nozzle(s) is in the range 0.5:1 to 50:1, preferably 1:1 to 10:1 (where the ratio of the volume of gas ($Q_g$) to the volume of liquid ($Q_l$) is determined at the desired reaction temperature and pressure).

The high shear mixing zone(s) may also comprise an open-ended conduit having a high shear pumping means positioned therein, for example a paddle or propeller having high shear blades. Suitably, the high shear pumping means is located close to the open end of the conduit for example, within 1 metermeter, preferably within 0.5 meters of the open end of the conduit. A gaseous stream comprising synthesis gas is injected into the open-ended conduit either immediately upstream or downstream of the high shear pumping means, preferably, immediately upstream of the high shear pumping means. By immediately upstream is meant that the gaseous stream is injected into the open-ended conduit less than 0.25 meters before the high shear pumping means. The gaseous stream may be injected into the open-ended conduit by means of a sparger. Without wishing to be bound by any theory, the injected gaseous stream is broken down into gas bubbles and/or irregularly shaped gas voids (hereinafter "gas voids) by the fluid shear imparted to the suspension by the high shear pumping means and the resulting gas bubbles and/or gas voids become entrained in the suspension. The resulting suspension containing entrained gas bubbles and/or gas voids is then discharged into the reactor vessel through the open end of the conduit. Suitably, the open end of the conduit is tapered outwardly, preferably at an angle of 5 to 25°, preferably 10 to 20° relative to the longitudinal axis of the conduit. Conveniently, the external conduit may recycle the suspension recycle stream to the open-ended conduit.

Suitably, the volume of suspension present in the high shear mixing zone(s) is substantially less than the total volume of suspension present in the reactor system, for example, less than 20%, preferably less than 10% of the total volume of suspension present in the reactor system.

Preferably, the fluid shear imparted to the suspension in the high shear mixing zone(s) breaks down at least a portion of the gaseous reactant stream into gas bubbles having diameters in the range of from 1 μm to 10 mm, preferably from 30 μm to 3000 μm, more preferably from 30 μm to 300 μm which then become entrained in the suspension.

Without wishing to be bound by any theory, it is believed that the irregularly shaped gas voids are transient in that they are coalescing and fragmenting on a time scale of up to 500 ms, for example, over a 10 to 500 ms time scale. The irregularly shaped gas voids have a wide size distribution with smaller gas voids having an average diameter of 1 to 2 mm and larger gas voids having an average diameter of 10 to 15 mm.

Suitably, kinetic energy is dissipated to the suspension present in the high shear mixing zone(s) at a rate of at least 0.5 kW/m$^3$ relative to the total volume of suspension present in the system. Preferably, the kinetic energy dissipation rate in the high shear mixing zone is in the range of from 0.5 to 25 kW/m$^3$, relative to the total volume of suspension present in the system, more preferably from 0.5 to 10 kW/m$^3$, most preferably from 0.5 to 5 kW/m$^3$, and in particular, from 0.5 to 2.5 kW/m$^3$.

In a preferred embodiment the process is carried out using at least one injector mixing nozzle, preferably a plurality of injector mixing nozzles. Very good mixing can be achieved when the injector-mixing nozzle(s) is situated at or near the top of the reactor vessel and the suspension is removed from the reactor vessel at or near its bottom. Therefore the reactor vessel is preferably provided at or near its top with at least one, preferably a plurality of injector-mixing nozzles and the suspension recycle stream is preferably withdrawn from at or near the bottom of the reactor vessel. Preferably, the suspension recycle stream is, at least in part recycled via an external conduit, having a slurry pump positioned therein, to the top of the injector-mixing nozzle(s) through which it is then injected into the top of the reactor vessel. The gaseous stream comprising synthesis gas is introduced through one or more openings in the side wall of the injector-mixing nozzle(s). An internal heat exchanger comprising an array of cooling tubes and/or cooling coils and/or cooling plates is located in the reactor vessel in regions which are outside of the blast zone(s) of the nozzle(s) so that the spray from the nozzle(s) does not impinge on the array. Without wishing to be bound by any theory it is believed that if the array extends into the blast zone(s) of the nozzle(s) that this interferes with the fluid dynamics in the reactor vessel and may also result in coalescence of gas bubbles and erosion of the cooling tubes and/or cooling coils, and/or cooling plates of the array. Preferably, an external heat-exchanger is positioned on the external conduit to remove at least a portion of the exothermic heat of reaction from the system.

As discussed above, a gas cap (containing unconverted synthesis gas, gaseous higher hydrocarbons, vaporized higher hydrocarbons, vaporized water, any vaporized liquid coolant and any inert gases) may be present in the top of reactor vessel above the level of the suspension. Suitably, the volume of the gas cap is not more than 40%, preferably not more than 30% of the volume of the reactor vessel. The high shear mixing zone(s) may discharge into the reactor vessel either above or below the level of suspension in the reactor vessel. An advantage of the high shear mixing zone(s) discharging below the level of suspension is that this improves the contact between the synthesis gas and the suspension in the reactor vessel.

A gaseous recycle stream may be withdrawn from the headspace of the reactor vessel and may be recycled to the high shear mixing zone(s). The gaseous recycle stream is preferably cooled before being recycled to the high shear mixing zone(s), for example, by passing the gaseous recycle stream through a heat exchanger. The gaseous recycle stream may be cooled to a temperature at which a two phase mixture of gas (comprising unconverted synthesis gas, methane by-product, gaseous higher hydrocarbons and any inert gases, for example, nitrogen) and condensed liquid (water by-product, low boiling liquid higher hydrocarbons and any liquid coolant) is formed. The condensed liquid may be separated from the gaseous recycle stream, for example, using a suitable gas-liquid separation means (e.g. a hydrocyclone, demister, gravity separator) and at least a portion of the condensed liquid may be recycled to the reactor vessel or the high shear mixing zone(s), for example, with fresh liquid coolant. Preferably, excess water by-product is removed from the separated condensed liquids using a suitable separation means (e.g. a decanter), before recycling the condensed liquids to the reactor vessel or high shear mixing zone(s). It is envisaged that the heat exchanger and gas-liquid separation means may be combined within a single unit in order to simplify recycling of the gaseous stream.

Fresh synthesis gas may be fed to the gaseous recycle stream, either upstream or downstream of the external exchanger. Where the synthesis gas has not been pre-cooled, the synthesis gas may be fed to the gaseous recycle stream upstream of the heat exchanger. Preferably, the gaseous recycle stream is recycled to the high shear mixing zone(s) via a blower or compressor located downstream of the external heat exchanger.

Preferably, a purge stream is taken from the gaseous recycle stream to prevent the accumulation of gaseous by-products, for example, methane or carbon dioxide, or any inert gases, for example, nitrogen in the system. If desired, any gaseous intermediate products may be separated from the purge stream. Preferably, such gaseous intermediate products are recycled to the reactor vessel where they may be converted to higher hydrocarbons.

In a further aspect of the present invention there is provided a reactor system for converting synthesis gas to higher hydrocarbons in the presence of a suspension comprising a particulate Fischer-Tropsch catalyst suspended in a liquid medium, said reactor system comprising (i) a reactor vessel, (ii) at least one high shear mixing zone having an outlet within the reactor vessel, (iii) an external conduit having a first end in fluid communication with an outlet of the reactor vessel, said outlet being located at or near the bottom of the reactor vessel, and a second end in fluid communication with the high shear mixing zone(s), (iv) a first heat exchanger positioned within the reactor vessel and (v) a second heat exchanger positioned on the external conduit characterized in that the heat exchange surfaces of the first heat exchanger are located within regions of the reactor which are outside of the blast zone(s) of the high shear mixing zone(s).

Preferred features of the reactor system are as described above in relation to the process of the present invention.

Preferably, the ratio of hydrogen to carbon monoxide in the synthesis gas used in the process of the present invention is in the range of from 20:1 to 0.1:1, especially 5:1 to 1:1 by volume, typically 2:1 by volume based on the total amount of hydrogen and carbon monoxide introduced to the system.

The synthesis gas may be prepared using any of the processes known in the art including partial oxidation of hydrocarbons, steam reforming, gas heated reforming, microchannel reforming (as described in, for example, U.S. Pat. No. 6,284,217 which is herein incorporated by reference), plasma reforming, autothermal reforming, and any combination thereof. A discussion of these synthesis gas production technologies is provided in "Hydrocarbon Processing" V78, N.4, 87–90, 92–93 (April 1999) and "Petrole et Techniques", N. 415, 86–93 (July–August 1998). It is also envisaged that the synthesis gas may be obtained by catalytic partial oxidation of hydrocarbons in a microstructured reactor as exemplified in "IMRET 3: Proceedings of the Third International Conference on Microreaction Technology", Editor W Ehrfeld, Springer Verlag, 1999, pages 187–196. Alternatively, the synthesis gas may be obtained by short contact time catalytic partial oxidation of hydrocarbonaceous feedstocks as described in EP 0303438. Preferably, the synthesis gas is obtained via a "Compact Reformer" process as described in "Hydrocarbon Engineering", 2000, 5, (5), 67–69; "Hydrocarbon Processing", 79/9, 34 (September 2000); "Today's Refinery", 15/8, 9 (August 2000); WO 99/02254; and WO 200023689.

Preferably, the higher hydrocarbons produced in the process of the present invention comprise a mixture of hydrocarbons having a chain length of greater than 2 carbon atoms, typically greater than 5 carbon atoms. Suitably, the higher hydrocarbons comprise a mixture of hydrocarbons having chain lengths of from 5 to about 90 carbon atoms. Preferably, a major amount, for example, greater than 60% by weight, of the higher hydrocarbons have chain lengths of from 5 to 30 carbon atoms. Suitably, the liquid medium comprises one or more higher hydrocarbons which are liquid under the process conditions.

The catalyst which may be employed in the process of the present invention is any catalyst known to be active in Fischer-Tropsch synthesis. For example, Group VIII metals whether supported or unsupported are known Fischer-Tropsch catalysts. Of these iron, cobalt and ruthenium are preferred, particularly iron and cobalt, most particularly cobalt.

A preferred catalyst is supported on a carbon based support, for example, graphite or an inorganic oxide support, preferably an inorganic refractory oxide support. Preferred supports include silica, alumina, silica-alumina, the Group IVB oxides, titania (primarily in the rutile form) and most preferably zinc oxide. The supports generally have a surface area of less than about 100 m$^2$/g, preferably less than 50 m$^2$/g, more preferably less than 25 m$^2$/g, for example, about 5 m$^2$/g.

The catalytic metal is present in catalytically active amounts usually about 1–100 wt %, the upper limit being attained in the case of unsupported metal based catalysts, preferably 2–40 wt %. Promoters may be added to the catalyst and are well known in the Fischer-Tropsch catalyst art. Promoters can include ruthenium, platinum or palladium (when not the primary catalyst metal), aluminium, rhenium, hafnium, cerium, lanthanum and zirconium, and are usually present in amounts less than the primary catalytic metal (except for ruthenium which may be present in coequal amounts), but the promoter:metal ratio should be at least 1:10. Preferred promoters are rhenium and hafnium.

The catalyst may have a mean particle size in the range 5 to 500 microns, preferably 10 to 250 microns, for example, in the range 10 to 30 microns.

Preferably, the suspension of catalyst discharged into the reactor vessel comprises less than 50% wt of catalyst particles, more preferably 10 to 40% wt of catalyst particles, most preferably 10 to 30% wt of catalyst particles.

The process of the invention is preferably carried out at a temperature of 180–380° C., more preferably 180–280° C., most preferably, 190–240° C.

The process of the invention is preferably carried out at a pressure of 5–50 bar, more preferably 15–35 bar, generally 20–30 bar.

The process of the present invention can be operated in batch or continuous mode, the latter being preferred.

Suitably, the gas hourly space velocity (GHSV) for a continuous process is in the range 100 to 40000 h$^{-1}$, more preferably 1000 to 30000 h$^{-1}$, most preferably 2000 to 15000 h$^{-1}$, for example 4000 to 10000 h$^{-1}$ at normal temperature and pressure (NTP) based on the feed volume of synthesis gas at NTP.

In a continuous process, in order to achieve a sufficiently high productivity, the suspension should be present in the reactor vessel for a certain period of time. It has been found that the average residence time of the liquid phase (i.e. the liquid component of the suspension) in the reactor vessel is advantageously in the range from 15 minutes to 50 hours, preferably 1 to 30 hours. Where two reactor vessels are operated in series it is preferred that the average residence time of the liquid phase in the first reactor vessel is in the range of 15 minutes to 50 hours, preferably 1 hour to 30 hours and the average residence time of the liquid phase in the second reactor vessel is in the range of 30 minutes to 30 hours.

Suitably, the gas residence time in the high shear mixing zone(s) (for example, the injector-mixing nozzle(s) is in the range 20 milliseconds to 2 seconds, preferably 50 to 250 milliseconds.

Suitably, the gas residence time in the reactor vessel is in the range 10 to 240 seconds, preferably 20 to 90 seconds.

Suitably, the gas residence time in the external conduit is in the range 10 to 180 seconds, preferably 25 to 60 seconds.

In a continuous process, product suspension is continuously removed from the system, preferably from the external conduit and is passed to a liquid-solid separation means, where liquid medium and liquid higher hydrocarbons are separated from the catalyst. Preferably, entrained gases are separated from the product suspension either within the liquid-solid separation means or prior to introducing the product suspension to the liquid-solid separation mean, for example in the external heat exchanger. Examples of suitable liquid-solid separation means include hydrocyclones, filters, gravity separators, T-piece separators and magnetic separators. Alternatively, the liquid medium and liquid higher hydrocarbons may be separated from the catalyst by distillation. Preferably, there are two or more product withdrawal lines (for two or more product side streams), each line leading to a dedicated liquid-solid separation means. This ensures continuous operation of the process by allowing one or more of the liquid-solid separation means to be taken off-line for cleaning. The separated liquids are then passed to a product purification stage where water by-product and liquid medium are removed from the liquid higher hydrocarbons. The purification stage may be simplified by using one or more of the liquid higher hydrocarbons produced in the process of the present invention as the liquid medium in which case there is no requirement to separate the liquid medium from the liquid higher hydrocarbons. The catalyst may be recycled as a concentrated slurry to the reactor vessel. Fresh catalyst may be added either to the recycled slurry or directly into the reactor vessel.

The liquid higher hydrocarbons from the purification stage may be fed to a hydrocracking stage, for example, a catalytic hydrocracking stage which employs a catalyst comprising a metal selected from the group consisting of cobalt, molybdenum, nickel and tungsten supported on a support material such as alumina, silica-alumina or a zeolite. Preferably, the catalyst comprises cobalt/molybdenum or nickel/molybdenum supported on alumina or silica-alumina. Suitable hydrocracking catalysts include catalysts supplied by Akzo Nobel, Criterion, Chevron, or UOP.

BRIEF DESCRIPTION OF THE DRAWINGS

The invention will now be described in more detail with reference to the accompanying drawings, in which.

DETAILED DESCRIPTION OF PREFERRED EMBODIMENTS

Figure 1:
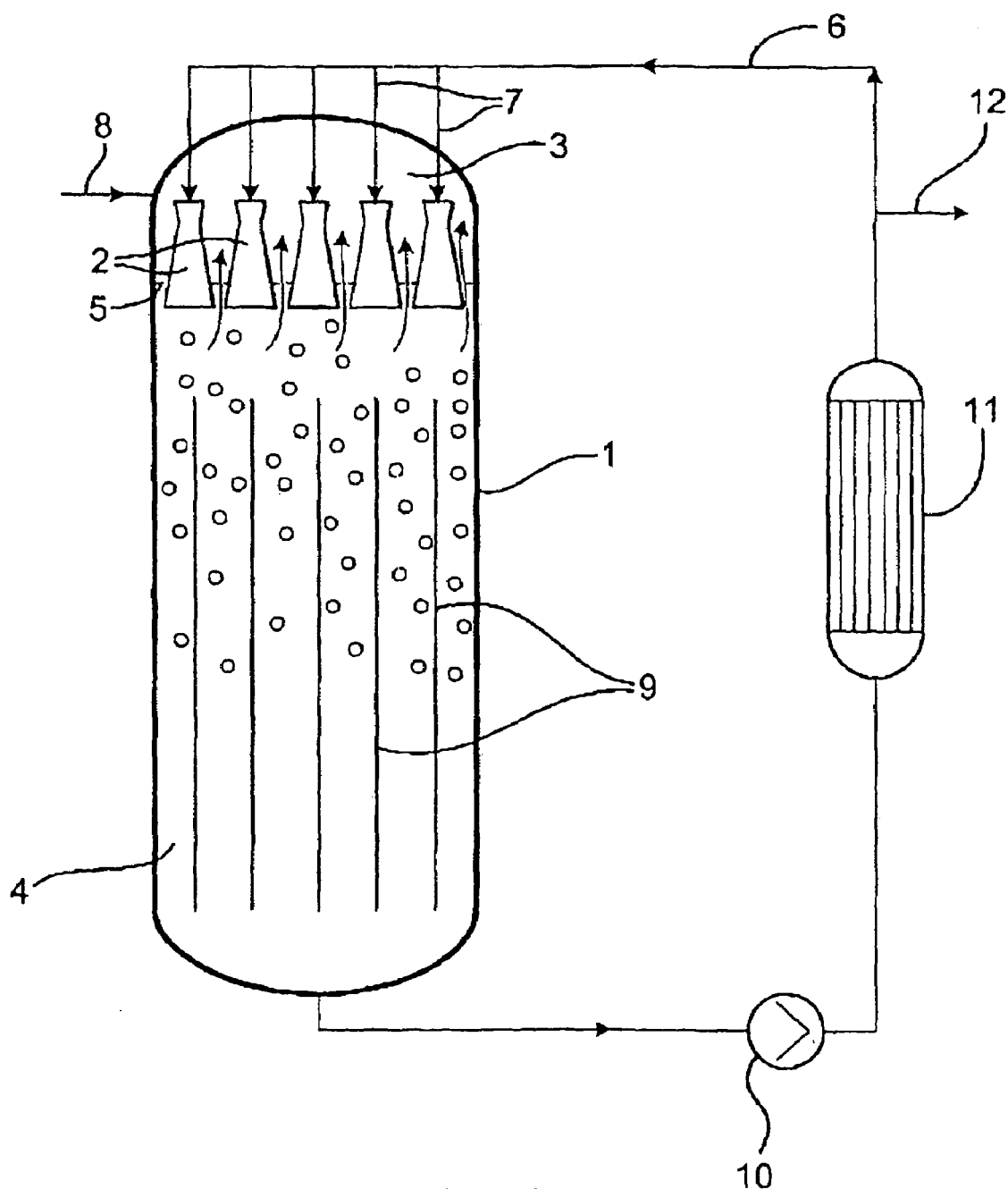
FIG. 1 illustrates a reactor system in accordance with the invention.

FIG. 1 illustrates a reactor system according to the present invention comprising a reactor vessel (1) and a plurality of venturi injector-mixing nozzles (2). A gas cap (3) is present in the upper part of the reactor vessel (1), the lower part of which contains a suspension (4) of particulate catalyst suspended in the liquid higher hydrocarbons. A dotted line (5) denotes the upper level of the suspension (4) in the reactor vessel (1). Suspension (4) is recycled to the venturi injector-mixing nozzles (2) via a line (6) and dedicated branch lines (7). Through one or more openings in the side walls of the venturi injector-mixing nozzles (2) a gaseous phase comprising synthesis gas is drawn into the nozzles (1) from the gas cap (3). Fresh synthesis gas is introduced into the gas cap (3) via a line (8).

The suspension is cooled within the reactor vessel (1) by means of a plurality of cooling tubes (9) positioned within the reactor vessel (1) below the upper level of the suspension (5) and which are located outside of the blast zones of the nozzles (2).

Via a lower outlet opening of the injector-mixing nozzles (2) the suspension having synthesis gas entrained therein is discharged into the reactor vessel (1) below the level (5) of the suspension (4). Unconverted gaseous reactants then separate into the gas cap (3).

Suspension (4) is withdrawn from the bottom of the vessel (1) and at least a portion of the suspension is recycled to the injector-mixing nozzles (2) by means of pump (10) and the line (6). The suspension passing through line (6) is cooled by means of an external heat exchanger (11).

Via a line (12) a portion of the suspension (4) is withdrawn from the system and is passed to a liquid-solid separation stage (not shown).

Figure 2:
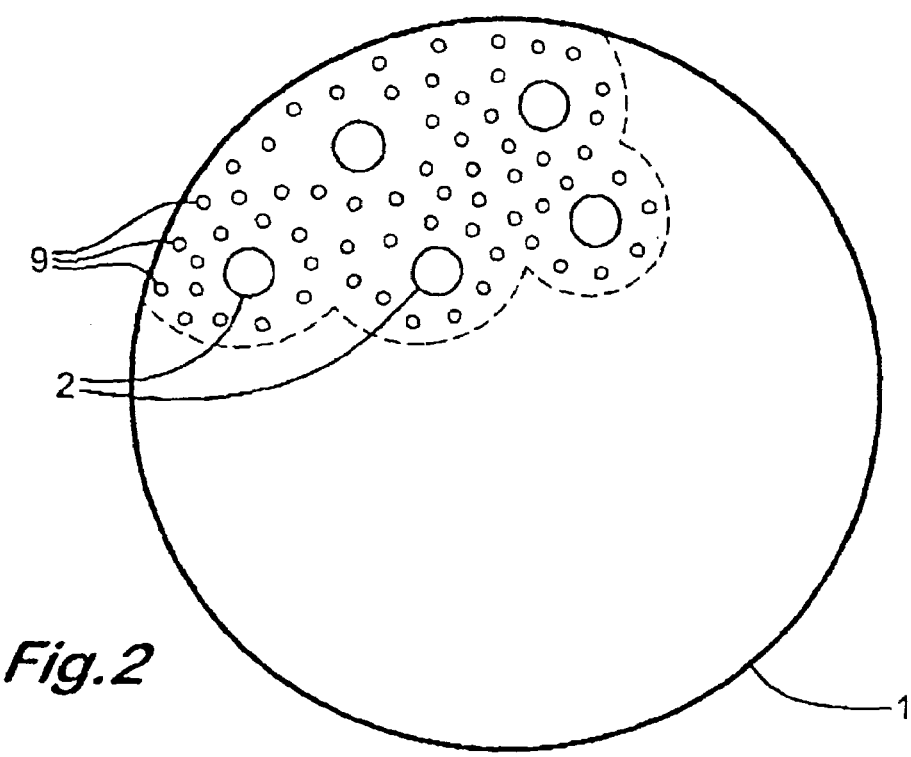
FIG. 2 illustrates a schematic plan view of the reactor vessel (1) showing the arrangement of the nozzles (2) and the cooling tubes (9)

FIG. 2 illustrates a schematic plan view of the reactor vessel (1) showing the arrangement of the nozzles (2) and the cooling tubes (9).

Figures 3A, 3B, 3C:
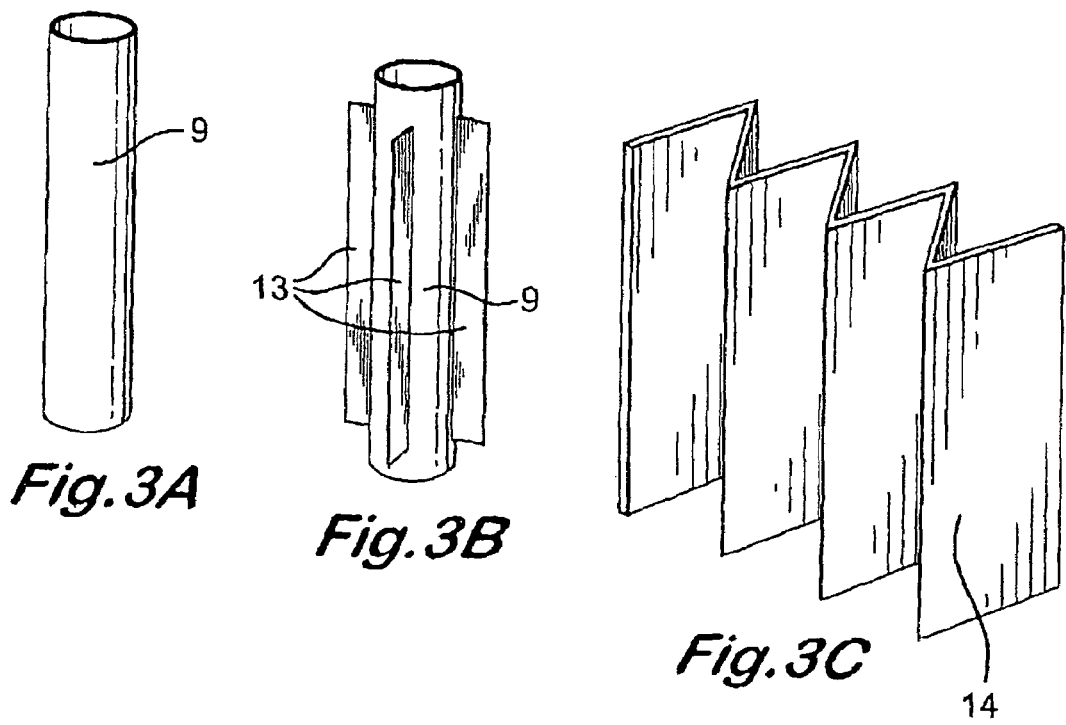
FIGS. 3A and 3B illustrate a cooling tube (9) and a finned cooling tube (13)
FIG. 3C illustrates a cooling plate (14).

FIGS. 3A and 3B illustrate a cooling tube (9) and a finned cooling tube (13) while FIG. 3C illustrates a cooling plate (14).

EXAMPLES

Example 1

It was calculated that for a 30,000 barrel a day commercial plant, between 500 and 550 MegaWatts of heat must be removed from the system to maintain the temperature of the suspension within the reactor vessel at the desired reaction temperature, ideally, isothermal. The amount of heat generated will depend on the type of catalyst and the product distribution.

Table 1 shows the relationship between the diameter of the constriction of a venturi nozzle and the number of venturi nozzles which would be required for a 30,000 barrel per day plant (where the lower value for the number of nozzles corresponds to a $Q_g:Q_l$ ratio of 1:1.5 and the higher value for the number of nozzles corresponds to a $Q_g:Q_l$ ratio of 2.5:1).

TABLE 1

Number of venturi nozzles for a 30,0000 bbl/d plant

| Diameter of restriction in Nozzle(inch) | Number of Venturi Nozzles | Bbl/d/nozzle | Pressure in Reactor Vessel (bara) |
|---|---|---|---|
| 2 | 345–207 | 87–145 | 20 |
| 3 | 153–93 | 195–326 | 20 |
| 4 | 86–52 | 348–579 | 20 |
| 4 | 65–39 | 463–772 | 30 |
| 5 | 56–33 | 539–898 | 20 |
| 5 | 42–25 | 718–1197 | 30 |
| 6 | 40–24 | 752–1253 | 20 |
| 6 | 30–18 | 1002–1670 | 30 |

Table 2 illustrates the % reduction in the rate at which suspension is required to be fed to an external heat exchange (to maintain the desired reaction temperature in the reactor vessel) with increasing cooling of the suspension in the external heat exchanger. In the base case, the heat exchanger is operated with the suspension being cooled to a temperature 12° C. below that of the suspension in the reactor vessel. It was found that in order to maintain substantially isothermal conditions in the reactor vessel, the suspension must be passed to the heat exchanger at a rate of 51,000 m³ of suspension per hour.

TABLE 2

Percentage Reduction in suspension recycle

| % reduction in suspension recycle | ΔT (° C.) |
|---|---|
| — | 12 |
| 20 | 15 |
| 40 | 20 |
| 52 | 25 |
| 60 | 30 |

However, the desired reduction in the rate of recycle to the external heat exchanger cannot be achieved using only an external heat exchanger owing to the risk of quenching of the Fischer-Tropsch synthesis reaction and/or deactivation of the catalyst in the external heat exchanger unit. Furthermore, without the presence of the internal heat exchanger unit it would not be possible to control adequately the temperature of the suspension in the reaction vessel. It is therefore necessary to remove at least a portion of the exothermic heat of reaction from the system by means of an internal heat exchanger positioned within the suspension in the reactor vessel.

TABLE 3

Heat removal from a 30,000 bbl/day plant

| % Heat removed by make-up feeds (fresh synthesis gas) | % Heat removed by vaporizing liquid coolant | % Heat removed by External Heat Exchanger | % Heat removed by Internal Heat Exchanger |
|---|---|---|---|
| 5 | 0 | 95<br>51,000 m³/h recycle | 0 |
| 5 | 5 | 50<br>27,000 m³/h recycle | 40 |
| 10 | 5 | 50<br>27,000 m³/h recycle | 30 |
| 10 | 10 | 30<br>15,500 m³/h recycle | 50 |

Table 3 illustrates how heat may be removed from a 30,000 bbl/day Fischer Tropsch plant via an internal heat exchanger, an external heat exchangers and by injecting a stream comprising a vaporizable liquid coolant. The total heat production of the plant is 505 MegaWatts.

Example 2

A suspension of aluminium oxide catalyst (15% w/w) in 800 litres of tetradecene was charged to a reactor system comprising a tank reactor vessel (straight length 4500 mm, diameter 420 mm) and an external conduit. A gas liquid separator, a first and a second three-phase centrifugal pump were positioned on the external conduit (the first centrifugal pump (P1080) located upstream and the second centrifugal pump (P1280) located downstream of the gas liquid separator). A 24 mm venturi nozzle was located in the upper region of the tank reactor vessel. Tetradecene was used as a mimic for the Fischer Tropsch wax, having similar physical properties at 30° C. as Fischer Tropsch wax at a temperature of between 200–250° C. Nitrogen was used as the gas feed to the venturi nozzle and suspension having gas bubbles and irregularly shaped gas voids dispersed therein was discharged from the nozzle below the level of suspension in the tank reactor vessel. The reactor system was pressurised from 0 to 30 bar (depending on the experimental conditions) using nitrogen and the suspension was pumped around the external conduit using the three-phase centrifugal pumps. The reactor system was then allowed to reach steady state.

A series of measurements was taken around the loop in the absence of any internal reactor cooling tubes, as detailed in Table 4 below. A series of cooling tubes were then introduced into the tank reactor vessel. The cooling tubes had an outer diameter of 25.4 mm. The cooling tubes were arranged in the tank reactor vessel such that there were 6 equi-spaced tubes located on a 200 mm PCD (PCD=pitch circle diameter) and 12 equi-spaced tubes on a 340 mm PCD. The series of measurements was then repeated with the cooling tubes in place. The results are shown in Table 5 below.

TABLE 4

No cooling tubes

System pressure 20 barg nitrogen;
Suspension recirculation rate 30 tonnes/hr

| | | |
|---|---|---|
| gas/liquid ratio | no gas | 1:1 |
| P1080% | 87 | 87 |
| P1080 rpm | 1479 | 1479 |
| Pressure drop across P1080 (bar) | 3.01 | 3.01 |
| P1080 head (m) | 35.59 | 35.59 |
| P1280% | 84 | 88 |
| Pressure drop across P1280 bar | 3.01 | 3.29 |
| P1280 rpm | 1428 | 1496 |
| P 1280 head (m) | 35.59 | 38.9 |
| Pressure in gas liquid separator (bar) | 19.93 | 20.01 |
| Pressure in external conduit downstream of P1280 (bar) | 22.94 | 23.3 |
| Pressure drop in venturi nozzle suction chamber (bar) | 1.03 | 0.74 |
| FV1092% (position of flow valve on gas recycle line from the reactor headspace to the venturi nozzle) | 0 | 32 |
| Flow rate of gaseous recycle stream from reactor headspace to the venturi nozzle (kg/hr) | 0 | 833 |
| Flow rate of gaseous recycle stream from the gas liquid separator to the venturi nozzle (kg/hr) | 0 | 0 |
| Pressure in the tank reactor vessel (bar) | 19.94 | 20.03 |
| Pressure drop of suspension across venturi nozzle (bar) | 2.55 | 2.8 |
| Suspension circulation rate (tonnes/hr) | 30 | 31 |

TABLE 5

Cooling tubes

System pressure 20 barg nitrogen;
Suspension recirculation rate 30 tonnes/hr

| | | |
|---|---|---|
| gas/liquid ratio | No gas | 1:1 |
| P1080% | 90 | 90 |
| P1080 rpm | 1530 | 1530 |
| Pressure drop across P1080 bar | 3.14 | 3.14 |
| P1080 head (m) | 37.12 | 37.12 |
| P1280% | 100 | 100 |
| Pressure drop across P1280 bar | 2.8 | 3.11 |
| P1280 rpm | 1700 | 1700 |
| P1280 head (m) | 33.1 | 36.77 |
| Pressure in gas liquid separator (bar) | 19.97 | 20.19 |
| Pressure in external conduit downstream of P1280 (bar) | 22.77 | 23.3 |
| Pressure drop over venturi nozzle suction chamber (bar) | 0.87 | 0.51 |
| FV1092% (Position of flow valve on gaseous recycle line from reactor head space to the venturi nozzle) | 0 | 32 |
| Flow rate of gaseous recycle stream from reactor headspace to venturi nozzle (kg/hr) | 0 | 735 |
| Flow rate of gaseous recycle stream from gas liquid separator to venturi nozzle (kg/hr) | 0 | 0 |
| Pressure in reactor vessel (bar) | 20 | 20.33 |
| Pressure drop of suspension across nozzle (bar) | 2.02 | 2.39 |
| Suspension circulation rate (tonnes/hr) | 27 | 29 |

The invention claimed is:

1. A process for the conversion of synthesis gas to higher hydrocarbons by contacting a gaseous stream comprising synthesis gas, at an elevated temperature and pressure, with a suspension comprising a particulate Fischer-Tropsch catalyst suspended in a liquid medium, in a system comprising at least one high shear mixing zone and a reactor vessel wherein the process comprises:
   (a) passing the suspension and the gaseous stream through a high shear mixing zone wherein the gaseous stream is broken down into gas bubbles and/or irregularly shaped gas voids;
   (b) discharging suspension having gas bubbles and/or irregularly shaped gas voids dispersed therein from the high shear mixing zone into the reactor vessel;
   (c) maintaining the temperature of the suspension discharged into the reactor vessel at the desired reaction temperature by means of an internal heat exchanger positioned within the suspension in the reactor vessel wherein at least 5% of the exothermic heat of reaction is removed from the system by means of the internal heat exchanger.

2. A process as claimed in claim 1 wherein at least 10% of the exothermic heat of reaction is removed from the system by means of the internal heat exchanger.

3. A process as claimed in claim 2 wherein at least 20% of the exothermic heat of reaction is removed from the system by means of the internal heat exchanger.

4. A process as claimed in claim 3 wherein between 30 to 50% of the exothermic heat of reaction is removed from the system by means of the internal heat exchanger.

5. A process as claimed in claim 1 wherein suspension is withdrawn from the reactor vessel and is at least in part recycled to the high shear mixing zone after being cooled by means of an external heat exchanger.

6. A process as claimed in claim 5 wherein between 20 to 55% of the exothermic heat of reaction is removed from the system in the external heat exchanger.

7. A process as claimed in claim 6 wherein between 30 to 50% of the exothermic heat of reaction is removed from the system in the external heat exchanger.

8. A process as claimed in claim 5 wherein the suspension recycle stream is cooled by means of the external heat exchanger to a temperature not more than 30° C. below, the temperature of the suspension in the reactor vessel.

9. A process as claimed in claim 5 wherein the suspension is withdrawn from the reactor vessel and is recycled to the high shear mixing zone by means of an external conduit having a first end in communication with an outlet for the suspension in the reactor vessel and a second end in communication with the high shear mixing zone and the external heat exchanger is positioned on the external conduit.

10. A process as claimed in claim 9 wherein the ratio of the volume of the external conduit—which excludes the volume of the external heat exchanger—to the volume of the reactor vessel is in the range of 0.005:1 to 0.2:1.

11. A process as claimed in claim 9 wherein the suspension is recycled through the external conduit at a rate of between (n×10,000) m³/h to (n×50,000) m³/h for a (n×30,000) barrel/day commercial plant where n is a number in the range 0.25 to 10.

12. A process as claimed in claim 1 wherein the reactor vessel approximates to a continuous stirred tank reactor (CSTR) having a Peclet number of less than 3 where the Peclet (Pe) number is defined by the equation:

$$Pe = U_g H/\delta$$

where $U_g$ is the gas velocity (ms⁻¹), H is the height of the suspension in the reactor vessel (m), and δ is the dispersion coefficient (m²s⁻¹).

13. A process as claimed in claim 1 wherein a heat exchange liquid is fed to the internal heat exchanger at a temperature which is at least 25° C. below the temperature of the suspension in the reactor vessel.

14. A process as claimed in claim 13 wherein a heat exchange liquid is fed to the internal heat exchanger at a temperature which is at least 50° C. below the temperature of the suspension in the reactor vessel.

15. A process as claimed in claim 14 wherein a heat exchange liquid is fed to the internal heat exchanger at a temperature which is at least 100° C. below the temperature of the suspension in the reactor vessel.

16. A process as claimed in claim 13 wherein the heat exchange liquid fed to the internal heat exchanger is selected from the group consisting of water, a solution of an inorganic salt, molten inorganic salts, a high boiling point oil and liquid sodium.

17. A process as claimed in claim 1 wherein the internal heat exchanger comprises an array of cooling tubes and/or cooling coils and/or cooling plates.

18. A process as claimed in claim 17 wherein the array is divided into 50 to 500 independently operated banks of cooling tubes and/or cooling coils and/or cooling plates.

19. A process as claimed in claim 17 wherein the cooling tubes of the array are arranged with their longitudinal axes aligned with the longitudinal axis of the reactor vessel.

20. A process as claimed in claim 17 wherein the cooling tubes have an outer diameter in the range 2 to 5 cm and are spaced apart from each other or from the walls of the reactor vessel by 10 to 20 cm.

21. A process as claimed in claim 17 wherein the cooling tubes are absent from a blast zone of the high shear mixing zone.

22. A process as claimed in claim 17 wherein each cooling coil of the array is in the form of a helix with the coil wound as if along a cylinder.

23. A process as claimed in claim 22 wherein the tubing of the cooling coils has an outer diameter of between 2.5 cm and 10 cm and the cooling coils are spaced apart from each other or from the walls of the reactor vessel by 10 to 20 cm.

24. A process as claimed in claim 22 wherein the blast zone of a high shear mixing zone is arranged so as to lie within the cylinder defined by the helix of the cooling coil and the diameter of the cylinder defined by the helix is at least 3 times the diameter of the outlet of a high shear mixing zone.

25. A process as claimed in claim 17 wherein the heat exchanger comprises an array of concertinaed or corrugated cooling plates having a breadth of from 2 to 10 cm and a distance across the folds of the concertinaed plates or between the peaks and troughs of the corrugated plates of from 10 to 50 cm and the cooling plates are spaced apart from each other and from the walls of the reactor vessel by at least 10 cm.

26. A process as claimed in claim 17 wherein the cooling tubes, cooling coils or cooling plates are finned.

27. A process as claimed in claim 17 wherein the cooling tubes, cooling coils or cooling plates lie below the level of suspension in the reactor vessel and extend through up to 80% of the height of the suspension in the reactor vessel.

28. A process as claimed in claim 1 wherein at least 5% of the exothermic heat of reaction is removed from the system by introducing a vaporizable liquid coolant to the reactor vessel and/or the high shear mixing zone at a temperature which is at least 25° C. below the temperature of the suspension in the reactor vessel.

29. A process as claimed in claim 28 wherein the vaporizable liquid coolant is selected from the group consisting of aliphatic hydrocarbons having from 5 to 10 carbon atoms, alcohols having from 1 to 4 carbon atoms, ethers, tetrahydrofuran and water.

30. A process as claimed in claim 1 wherein the reactor system comprises 10 to 400 high shear mixing zones and the high shear mixing zones discharge into a single reactor vessel or into 2 or 3 reactor vessels connected in series.

31. A process as claimed in claim 1 wherein the high shear mixing zone comprise (a) an injector-mixing nozzle(s) or (b) an open-ended conduit(s) having a high shear pumping means positioned therein and a gas sparger located immediately upstream or downstream of the high shear pumping means.

32. A process as claimed in claim 31 wherein the injector-mixing nozzle(s) is executed as a venturi nozzle(s) or as gas blast nozzle(s).

33. A process as claimed in claim 32 wherein the pressure drop of the suspension over the venturi nozzle(s) is in the range of from 2 to 15 bar and the ratio of the volume of gas ($Q_g$) to the volume of liquid ($Q_l$) passing through the venturi nozzle(s) is in the range 1:1 to 5:1 measured at the conditions of elevated temperature and pressure.

34. A process as claimed in claim 32 wherein the pressure drop of gas over the gas blast nozzle(s) is in the range 3 to 100 bar, the pressure drop of the suspension over the gas blast nozzle(s) is in the range of from 4 to 15 bar and the ratio of the volume of gas ($Q_g$) to volume of liquid ($Q_l$) passing through the gas blast nozzle(s) is in the range 1:1 to 10:1 measured at the conditions of elevated temperature and pressure.

35. A process as claimed in claim 32 wherein the injector mixing nozzle(s) are located at or near the top of the reactor vessel and project downwardly into the reactor vessel.

36. A process as claimed in claim 35 wherein the injector mixing nozzle(s) are angled at an angle of no more than 5° relative to the longitudinal axis of the reactor vessel.

37. A process as claimed in claim 32 wherein the outlet of the nozzle(s) are tapered outwardly so that the spray which exits the nozzle diverges outwardly at an angle of less than 30° relative to the initial direction of discharge of the spray.

38. A process as claimed in claim 1 wherein the fluid shear imparted to the suspension in the high shear mixing zone breaks down at least a portion of the gaseous stream comprising synthesis gas into gas bubbles having diameters in the range of from 30 μm to 3000 μm which bubbles become entrained in the suspension.

39. A process as claimed in claim 1 wherein the irregularly shaped gas voids dispersed in the suspension discharged into the reactor vessel either coalesce to form larger gas voids or fragment to form smaller gas voids with the gas voids having an average duration of up to 500 ms.

40. A process as claimed in claim 1 wherein kinetic energy is dissipated to the suspension present in the high shear mixing zone at a rate of from 0.5 to 25 kW/m³, relative to the total volume of suspension present in the system.

41. A process as claimed in claim 1 wherein the process is operated in continuous mode and the average residence time of the liquid component of the suspension in the reactor vessel is in the range from 15 minutes to 50 hours.

42. A process as claimed in claim 5 wherein up to 50% by volume of the hydrogen component of the synthesis and/or up to 50% by volume of the carbon monoxide component of the synthesis gas is introduced into the suspension recycle stream.

43. A process as claimed in claim 29 wherein the alcohol is selected from methanol and ethanol, and the ether is dimethyl ether.

* * * * *